US012730260B2

(12) United States Patent
Liao et al.

(10) Patent No.: US 12,730,260 B2
(45) Date of Patent: Sep. 8, 2026

(54) PHOTONIC DEVICE AND METHOD OF FABRICATING SAME

(71) Applicant: Taiwan Semiconductor Manufacturing Company LTD, Hsinchu (TW)

(72) Inventors: Shih-Yu Liao, Hsinchu (TW); Tao-Cheng Liu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 336 days.

(21) Appl. No.: 18/375,275

(22) Filed: Sep. 29, 2023

(65) Prior Publication Data

US 2025/0110274 A1 Apr. 3, 2025

(51) Int. Cl.
*G02B 6/12* (2006.01)
*G02B 6/122* (2006.01)
*G02B 6/13* (2006.01)

(52) U.S. Cl.
CPC ............... *G02B 6/122* (2013.01); *G02B 6/13* (2013.01); *G02B 2006/12038* (2013.01); *G02B 2006/12061* (2013.01); *G02B 2006/12104* (2013.01)

(58) Field of Classification Search
CPC ................................ G02B 6/122; G02B 6/13; G02B 2006/12038; G02B 2006/12061; G02B 2006/12104
USPC ........................................................... 385/14
See application file for complete search history.

(56) References Cited

U.S. PATENT DOCUMENTS

| | | | |
|---|---|---|---|
| 9,817,185 B2 | 11/2017 | Sacher et al. | |
| 10,620,371 B2 | 4/2020 | Dumais et al. | |
| 2012/0189024 A1* | 7/2012 | Fattal | H01S 5/18363 372/12 |
| 2018/0003895 A1* | 1/2018 | Baudot | G02B 6/1228 |
| 2018/0128974 A1* | 5/2018 | Iida | G02B 6/122 |
| 2021/0072460 A1 | 3/2021 | Zhang | |

FOREIGN PATENT DOCUMENTS

| | | |
|---|---|---|
| CN | 109477936 B | 3/2022 |
| TW | 202229949 A | 8/2022 |

OTHER PUBLICATIONS

Taiwan Office Action for Application No. 11420565880, Dated Jun. 3, 2025.

* cited by examiner

*Primary Examiner* — Jerry M Blevins
(74) *Attorney, Agent, or Firm* — Lippes Mathias LLP

(57) ABSTRACT

A photonic device structure and method of fabricating the same. The structure includes a substrate that has a first top oxide layer and a silicon layer that is formed on the first top oxide layer. The structure further includes a plurality of rib waveguide components that are formed in the silicon layer. A first rib waveguide component of the plurality includes first contact holes having a first contact hole depth, and a second rib waveguide component of the plurality includes second contact holes having a second contact hole depth, such that the depths of the first contact hole and the second contact hole are different.

17 Claims, 15 Drawing Sheets

PHOTONIC DEVICE AND METHOD OF FABRICATING SAME

BACKGROUND

As integrated circuits (ICs) become increasingly smaller and faster, electrical signals used in various types of ICs are also subject to increasing delays caused by capacitance, inductance, or resistance in the ICs. At a certain high speed and/or frequency, such delays become a design concern. To avoid potential signal delay issues, optical signals are used instead of electrical signals for data transmission in some situations.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
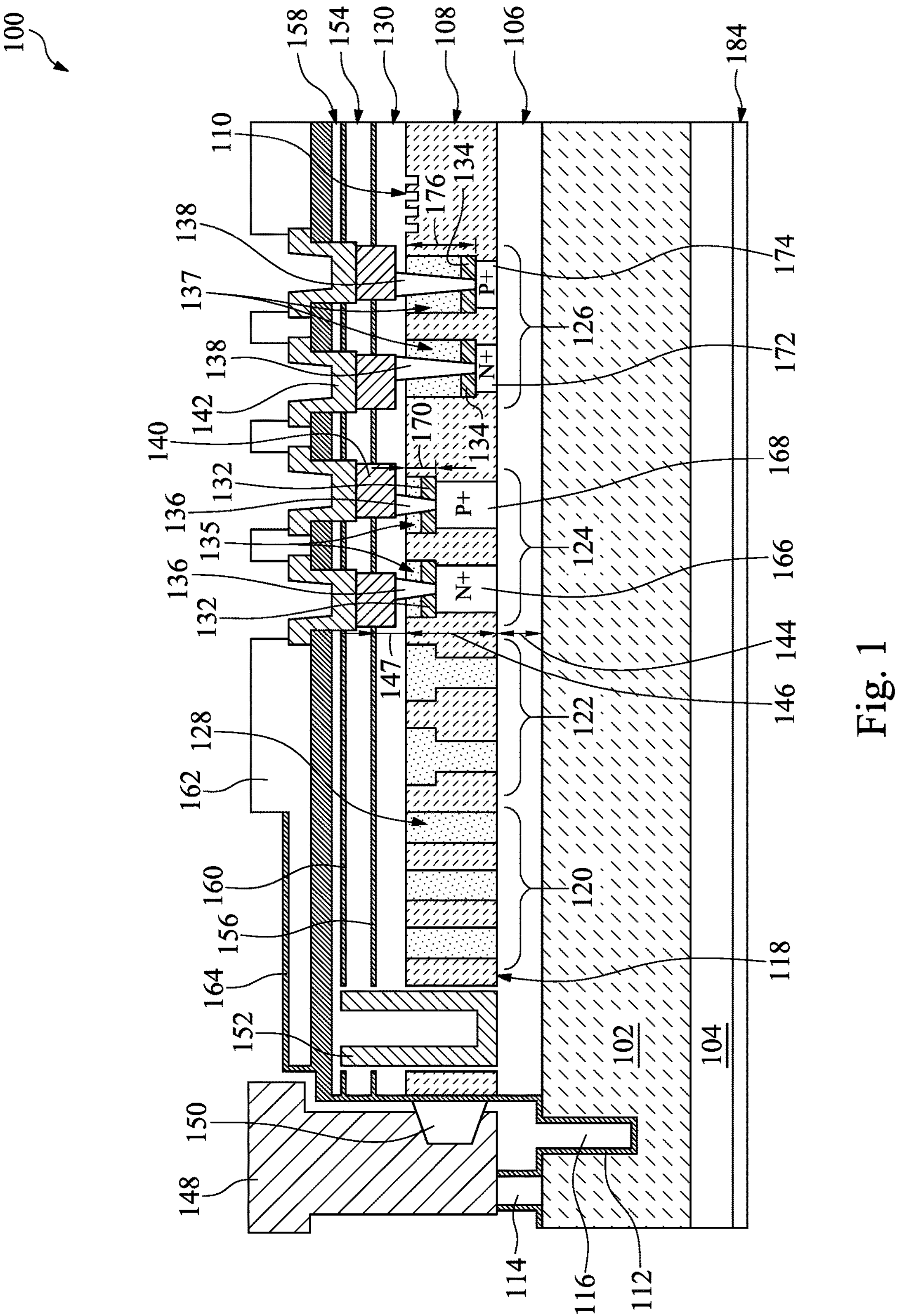
FIG. 1 is a cross-sectional view of a photonic device in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

The present disclosure relates to structures which are made up of different layers. When the terms "on" or "upon" are used with reference to two different layers (including the substrate), they indicate merely that one layer is on or upon the other layer. These terms do not require the two layers to directly contact each other, and permit other layers to be between the two layers. For example, all layers of the structure can be considered to be "on" the substrate, even though they do not all directly contact the substrate. The term "directly" may be used to indicate two layers directly contact each other without any layers in between them. In addition, when referring to performing process steps to the substrate, this should be construed as performing such steps to whatever layers may be present on the substrate as well, depending on the context.

Rib waveguides include a contact extending through a contact etch stop layer to contact a dopant region positioned underneath. Oxide hard masks or layers deposited on the contact etch stop layer may collapse during patterning of the contact etch stop layer and/or patterning of the contact itself. Turning now to FIG. 1, there is shown a photonic device 100 in accordance with one embodiment. As shown in FIG. 1, the photonic device 100 includes a substrate 102 having backside oxide layer 104 and a first topside oxide layer 106. In accordance with some embodiments, the substrate 102 may comprise, for example and without limitation, silicon, for example and without limitation, in the form of crystalline Si or polycrystalline Si. In alternative embodiments, the substrate 102 can be made of other elementary semiconductors such as germanium, or may include a compound semiconductor such as silicon carbide (SiC), gallium arsenide (GaAs), gallium carbide, gallium phosphide, indium arsenide (InAs), indium phosphide (InP), silicon germanium, silicon germanium carbide, gallium arsenic phosphide, or gallium indium phosphide. In accordance with one embodiment, the substrate 102 may be implemented as an SOI substrate, i.e., a silicon-on-insulator substrate. In such embodiments, the substrate 102 may comprise, for example and without limitation silicon oxide, or other suitable insulative material.

According to some embodiments, the backside oxide layer 104 and the first topside oxide layer 106 may comprise, for example and without limitation, non-low-k dielectric materials such as silicon oxide, silicon carbide (SiC), silicon carbo-nitride (SiCN), silicon oxy-carbo-nitride (SiOCN), or the like. In such embodiments, the backside oxide layer 104 and the first topside oxide layer 106 may have a thickness in the range of 0.5 um to 3 um and in some embodiments, may have a thickness of 2 um. As shown in FIG. 1, the photonic device 100 further includes a first silicon layer 108, formed on the first topside oxide layer 106. In accordance with some embodiments, the first silicon layer 108 may comprise a silicon, for example and without limitation, in the form of crystalline Si or polycrystalline Si. In accordance with some embodiments, the first silicon layer 108 may be implemented with a thickness in the range of 1 um to 5 um, and in some embodiments, may have a thickness of 3 um. A distributed Bragg reflector ("DBR") 110 is formed on a top portion of the first silicon layer 108, as depicted in FIG. 1. It will be appreciated that the construction and/or location of the DBR 110 may be dependent upon the particular application for which the photonic device 100 is used, the needed wavelengths traveling therethrough, and the like.

The photonic device 100 of FIG. 1 further includes a first etch stop layer 112, formed on portions of the substrate 102 and additional layers of the photonic device 100, as described herein. It will be appreciated that the first etch stop layer 112 may comprise any suitable barrier material configured to protect the layers and components below from damage during subsequent etching processes. The first etch stop layer 112 may be implemented as tantalum oxide (TaO), tantalum (Ta), titanium (Ti), silicon nitride (SiN), and the like. It will be appreciated that the first etch stop layer 112 corresponds to a layer of material that has drastically different etching characteristics than the material to be etched, so as to stop or halt the etching processing of the layer deposited on the etch stop layer. In accordance with one embodiment, a pillar 114 is formed from the material of the first silicon layer 108 on one side of the photonic device 100, as shown in FIG. 1. In some embodiments, the pillar 114 is positioned adjacent a pillar cavity 116, extending downward into the substrate 102, as illustrated in FIG. 1. According to such embodiments, the pillar 114 may be used to support a light source 148, as discussed in greater detail below.

The photonic device 100 illustrated in FIG. 1 further includes an echelle grating component 118, a strip waveguide component 120, a rib to strip (R2S) waveguide component 122, and a plurality of rib waveguide components (shown in FIG. 1 as the first rib waveguide 124 and the second rib waveguide 126). Each of the aforementioned waveguide components 118-126 are suitably positioned at least partially in the first silicon layer 108. As shown in FIG. 1, a silicate glass material 128 is formed within each of the waveguide components 118-126, as described in greater detail below with respect to FIGS. 2A-2Z. That is, as depicted in FIG. 1, the silicate glass material 128 may be deposited between portions of the first silicon layer 108, the combination thereof providing structure to the aforementioned waveguide components 118-126. In accordance with one example embodiment the silicate glass material 128 is a borophosphosilicate glass (BPSG) material. It will be appreciated that other suitable silicate glasses or materials providing similar optic properties and/or insulative properties may be used in other embodiments.

In accordance with some embodiments, the echelle grating waveguide component 118 may correspond to a type of diffraction grating having relatively low groove density and a groove shape that is optimized for use at high incidence angles and thus high diffraction orders. In accordance with further embodiments, the strip waveguide component 120 may correspond to a class of waveguides having the form of a channel running along the surface of some solid transparent host medium, e.g., a dielectric or semiconductor. The R2S waveguide component 122 may correspond to a converter component that converts a rib waveguide output to a strip waveguide input and/or a strip waveguide output to a rib waveguide input. Further, as shown in FIG. 1, the photonic device 100 includes a plurality of rib waveguide components 124-126, which may correspond to a waveguide in which the guiding layer may consists of the slab with a strip (or several strips) superimposed onto it. As will be appreciated by the skilled artisans, rib waveguides may provide confinement of the wave in two dimensions and near-unity confinement is possible in multi-layer rib structures. It will be appreciated that while two rib waveguide components 124 and 126 are shown in FIG. 1, the photonic device 100 may be implemented with a single rib waveguide component or more than two rib waveguide components, e.g., three, four, five, etc., in accordance with desired design configurations. As such, the illustration in FIG. 1 is intended solely as one illustrative example embodiment in accordance with the subject disclosure.

As shown in FIG. 1, the photonic device 100 further includes an undoped silicate glass ("USG") component 130 disposed on the first silicon layer 108 and the BSPG material 108. In some embodiments, the undoped silicate glass (USG) component 130 may be implemented having a thickness in the range of 5,000 angstroms to 10,000 angstroms. In one embodiment, the undoped silicate glass (USG) component 130 is implanted with a thickness of 8 angstroms.

A second etch stop layer 156 is formed on the USG component 130, as shown in FIG. 1. In accordance with some embodiments, the second etch stop layer 156 may comprise a suitable barrier material configured to protect the layers and components below from damage during subsequent etching processes. The second etch stop layer 156 may be implemented as tantalum oxide (TaO), tantalum (Ta), titanium (Ti), silicon nitride (SiN), and the like. It will be appreciated that the second etch stop layer 156 corresponds to a layer of material that has drastically different etching characteristics than the material to be etched, so as to stop or halt the etching processing of the layer deposited on the etch stop layer.

Positioned above the second etch stop layer 156 is a second topside oxide layer 154. A third topside oxide layer 158 is suitably formed on the second etch stop layer 156, as shown in FIG. 1. In accordance with some embodiments, the second topside oxide layer 154 and the third topside oxide layer 158 may comprise, for example and without limitation, for example and without limitation, non-low-k dielectric materials such as silicon oxide, silicon carbide (SiC), silicon carbo-nitride (SiCN), silicon oxy-carbo-nitride (SiOCN), or the like. A third etch stop layer 160 is depicted in FIG. 1, formed on the third topside oxide layer 158. As indicated above with respect to the first and second etch stop layers 112 and 156, the third etch stop layer 160 suitably comprises a layer of material that has drastically different etching characteristics than the material to be etched, so as to stop or halt the etching processing of the layer deposited on the etch stop layer. Accordingly, the third etch stop layer 160 may comprise, for example and without limitation tantalum oxide (TaO), tantalum (Ta), titanium (Ti), silicon nitride (SiN), and the like.

In accordance with some embodiments, the photonic device 100 of FIG. 1 further includes a fourth topside oxide layer 162 formed or deposited on the third etch stop layer 160. Such fourth topside oxide layer 162 may comprise, for example and without limitation, non-low-k dielectric materials such as silicon oxide, SiC, SiCN, SiOCN, or the like. A fourth etch stop layer 164 may be formed on the fourth topside oxide layer 162, as shown in FIG. 1. In some embodiments, the fourth etch stop layer 164 may comprise, for example and without limitation tantalum oxide (TaO), tantalum (Ta), titanium (Ti), silicon nitride (SiN), and the like. In varying embodiments disclosed herein, the first, second, third, and fourth topside oxide layers 106, 154, 158, and 162 may comprise the same or different oxide materials. In some embodiments, the aforementioned oxide layers 106, 154, 158, and 162 may comprise the same oxide material, deposited or formed at different times or stages of the fabrication of the photonic device 100.

In FIG. 1, the first rib waveguide component 124 includes first contact holes 135 extending a preselected distance into the first silicon layer 108, first contacts 136 formed of a suitably conductive material extending through the first contact holes 135, a first rib N+ doped component 166, and a P+ doped component 168 positioned below a first contact etch stop layer (CESL1) 132 within the first silicon layer 108. As illustrated in FIG. 1, the first contact hole 135 includes the aforementioned silicate glass material 128. In accordance with some embodiments, the depth of the first contact etch stop layer (CESL1) 132 is 5% or greater than the depth of the first contact hole 135. In accordance with some embodiments, the first contact etch stop layer (CESL1) 132 may be fabricated of, for example and without limitation, oxide, SiN, undoped silicate glass, fluorosilicate glass, borophosphosilicate glass, or the like.

As will be appreciated, the doping to form components 166 and 168 may be done, for example, by ion implantation. Briefly, an ion implanter is used to implant atoms into a silicon crystal lattice, modifying the conductivity of the lattice in the implanted location. An ion implanter generally includes an ion source, a beam line, and a process chamber. The ion source produces the desired ions (here, for example, Co, Ti, Ni, Pt, or Pb, depending on desired N- or P-type electrode). The beam line organizes the ions into a beam having high purity in terms of ion mass, energy, and species. The ion beam is then used to irradiate the wafer substrate in a process chamber. The ion beam strikes the exposed regions on the wafer substrate, and the ions can be implanted into the substrate as dopants at desired depths. Alternatively, the substrate can be partially etched, followed by blanket deposition of a metal, followed by annealing in which the metal reacts with the underlying exposed silicon. Unreacted metal can then be removed, for example with a selective etch process. As illustrated in FIG. 1, the first contact holes 135 include a first contact hole depth 170 of between 8,000 to 14,000 angstroms into the first silicon layer 108. In other embodiments, the first contact hole depth 170 is in the range of between 9,000 to 12,000 angstroms into the first silicon layer 108. In accordance with some embodiments, the first rib doped components 166 and 168 may have a dopant concentration that is greater than the dopant concentration of the second rib doped components 172, 174. It will further be appreciated that the first contacts 136 extend through the first contact etch stop layer (CESL1) 132 to contact respective first rib doped components 166 and 168.

In accordance with some embodiments, the first contacts 136 are electrically contacting metal components 140 formed partially in the second and third topside oxide layers 154 and 158, as shown in FIG. 1. According to such an embodiment, each metal component 140, which may provide similar function to a via, is in electrical contact with a corresponding bump pad 142. It will be appreciated that the metal components 140 may be implemented as, for example and without limitation, any suitable conductive material including, for example and without limitation, a suitable conductive metal including, for example and without limitation, copper, aluminum, iron, alloys thereof. Further, some embodiments disclosed herein may utilize a bump pad 142 comprised of, for example and without limitation, Al, Fe, Cu, Al—Cu, alloys thereof, or any other suitable material, as will be appreciated by the skilled artisan. As shown in FIG. 1, each of the bump pads 142 are suitably disposed through the fourth topside oxide layer 162. Subsequent fabrication (not shown) may include the addition of one or more solder bumps comprising lead-alloy solders, lead-free solders, flux-core solder, silver-alloy solders, or the like.

As shown in FIG. 1, the second rib waveguide component 126 includes second contact holes 137 extending a preselected distance into the first silicon layer 108 and including the aforementioned silicate glass material 128, second contacts 138 formed of a suitably conductive material extending through the second contact holes 137, a second rib N+ doped component 172, and a second rib P+ doped component 174 positioned below a second contact etch stop layer (CESL2) 134 within the first silicon layer 108. In accordance with some embodiments, the depth of the second contact etch stop layer (CESL2) 134 is 5% or greater than the depth of the second contact hole 137. In accordance with some embodiments, the second contact etch stop layer (CESL2) 134 may be fabricated of, for example and without limitation, oxide, SiN, undoped silicate glass, fluorosilicate glass, borophosphosilicate glass, or the like.

As discussed above with respect to the first rib doped components 166-168, the doping to form second rib doped components 172 and 174 may be done, for example, by ion implantation. As illustrated in FIG. 1, the second contact holes 137 include a second contact hole depth 176 of between 10,000 to 30,000 angstroms into the first silicon layer 108. In other embodiments, the second contact hole depth 176 is in the range of between 12,000 to 24,000 angstroms into the first silicon layer 108. In accordance with some embodiments, the second rib doped components 172 and 174 may have a dopant concentration that is less than the dopant concentration of the first rib doped components 166 and 168. In such embodiments, the second dopant concentration may be 1/10 of the first dopant concentration. It will further be appreciated that the contact holes 137 extend through the second contact etch stop layer 134, allowing the contacts 138 to contact respective second rib doped components 172 and 174. It will be appreciated that while shown as having two rib waveguide components, the subject device 100 may include three or more rib waveguide components, each of which may have different contact hole depths and dopant concentrations. Further, in such embodiments, the order of the rib waveguides may change, with shallower rib waveguides (i.e., shallow contact holes) being positioned after deeper rib waveguides, positioned between varying depth rib waveguides, or the like.

In accordance with some embodiments, the second contacts 138 are electrically contacting metal components 140 formed partially in the second and third topside oxide layers 154 and 158, as shown in FIG. 1. According to such an embodiment, each metal component 140, which may provide similar function to a via, is in electrical contact with a corresponding bump pad 142. It will be appreciated that the metal components 140 and the bump pads 142 of the second rib waveguide component 126 may be constructed of the same or similar materials as those described above with respect to the first rib waveguide component 124. Furthermore, as previously discussed, each of the bump pads 142 are suitably disposed through the fourth topside oxide layer 162. Subsequent fabrication (not shown) may include the addition of one or more solder bumps comprising lead-alloy solders, lead-free solders, flux-core solder, silver-alloy solders, or the like.

In accordance with one embodiment, the photonic device 100 of FIG. 1 may utilize a light source 148 coupled to the pillar 114 and positioned above the pillar cavity 116. The light source 148 may be implemented as, for example and without limitation, a laser (e.g., a III-V laser), an optical fiber, an exterior light source, a reflected light, or the like. In some embodiments, the light source 148 may produce light in the wavelength range of 200 nm to 1300 nm, and in some embodiments in the range of 300 nm to 1200 nm. A facet 150 is optically coupled to the light source 148, directing any light into the photonic device 100, as shown in FIG. 1. Accordingly, the illustration of the light source component 148 depicted in FIG. 1 is intended merely to illustrate the direction of light (i.e., photons) into the photonic device 100. The photonic device 100 of FIG. 1 may further include one or more metal components 152 disposed therein to provide additional functionality and transmissivity therein.

As shown in FIG. 1, the first contact holes 135 and the second contact holes 137 are illustrated as having different depths. In accordance with some embodiments, the different depth contact enables the photonic device 100 to accept different light sources, different wavelengths, etc., to transfer differing signals. The skilled artisan will appreciate that a single depth of contact in a photonic device may be limited in the light source(s) available for use, whereas the embodiments set forth herein provide for a variety of light sources and different signal transfers.

Figure 2A:
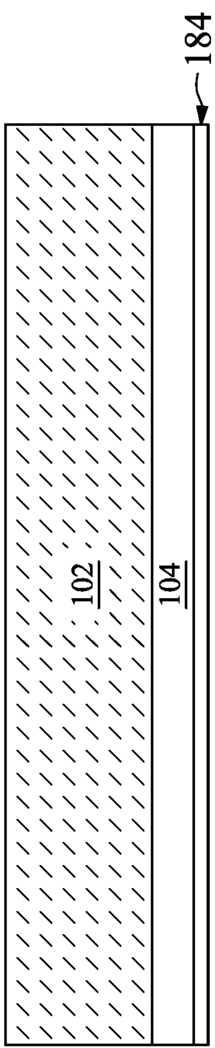
FIGS. 2A-2Z are cross-sectional views of stages of fabricating a portion of the photonic device of FIG. 1 in accordance with some embodiments.

Turning now to FIGS. 2A-2Z, there are shown a series of intermediate stages of fabrication optical components of the photonic device 100 of FIG. 1 in accordance with some embodiments. The patterning of a layer may employ any suitable patterning technique such as a photolithographic patterning technique using deposition of a photoresist layer and selective exposure via a photomask to visible light, ultraviolet light, deep ultraviolet light (i.e., DUV lithography), extreme ultraviolet light (i.e. EUV lithography), or so forth, followed by development of the exposed photoresist and subsequent etching, deposition or other process steps laterally delineated by the developed photoresist. In other embodiments, patterning of an electron-sensitive resist layer may be by way of electron beam exposure (electron beam lithography, i.e., e-beam lithography). The skilled artisan will appreciate that the foregoing are merely illustrative examples.

As shown in FIG. 2A, a substrate 102 is formed having a backside oxide layer 104. In some embodiments, the backside oxide layer 104 includes a polyimide layer 184 formed on a surface thereof opposite the surface contacting the substrate 102. In accordance with one embodiment, the substrate 102 is an SOI substrate, as described above with respect to FIG. 1.

Figure 2B:
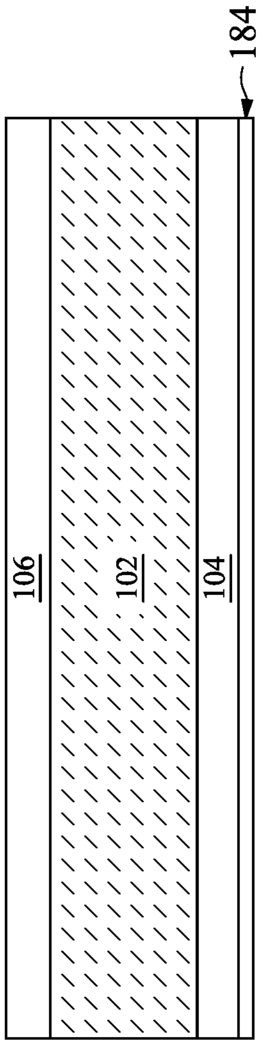

In FIG. 2B, a first topside oxide layer 106 is formed on the substrate 102. As shown in FIG. 2B, the first topside oxide layer 106 is deposited on the top side of the substrate opposite the side of the substrate 102 to which the bottom oxide layer 104 is attached. As referenced above, the first topside oxide layer 106 may comprise, for example and without limitation, non-low-k dielectric materials such as silicon oxide, silicon carbide (SiC), silicon carbo-nitride (SiCN), silicon oxy-carbo-nitride (SiOCN), or the like. In accordance with some embodiments, formation of the first topside oxide layer 106 may be accomplished via any suitable deposition or layer processes, including, for example and without limitation, deposited by, for example, chemical vapor deposition (CVD), physical vapor deposition (PVD), atomic layer deposition (ALD), sputtering, another deposition process, or any suitable combination thereof. In some embodiments, chemical-mechanical polishing (CMP) may be performed after deposition of the first topside layer 106, resulting in the planar surface shown in FIG. 2B.

Figure 2C:
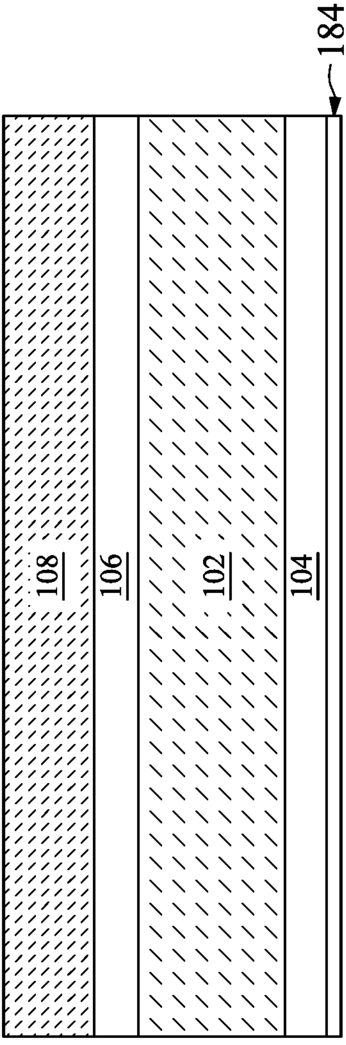

A first silicon layer 108 is then deposited on the first topside oxide layer 106, as shown in FIG. 2C. Suitable methods of forming the first silicon layer 108 may include, for example and without limitation, chemical vapor deposition (CVD), physical vapor deposition (PVD), atomic layer deposition (ALD), sputtering, another deposition process, or any suitable combination thereof. In some embodiments, chemical-mechanical polishing (CMP) may be performed after deposition of the first silicon layer 108, resulting in the planar surface shown in FIG. 2C. The first silicon layer 108 may comprise a silicon, for example and without limitation, in the form of crystalline Si or polycrystalline Si. In accordance with some embodiments, the first silicon layer 108 may be implemented with a thickness in the range of 1 um to 5 um, and in some embodiments, may have a thickness of 3 um.

Figure 2D:
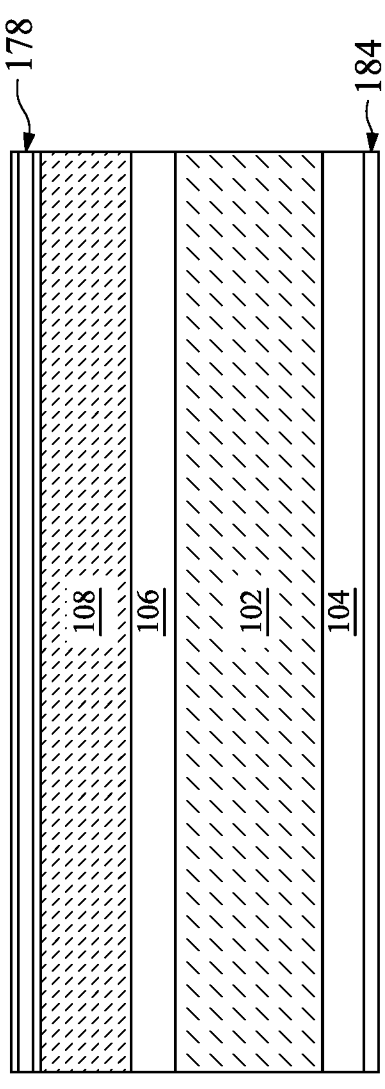

A hard mask 178 is then formed on the first silicon layer 108, as depicted in FIG. 2D. In accordance with some embodiments, the hard mask 178 comprises layers of oxide material with a polyimide layer disposed therebetween. In some embodiments, a first oxide material is deposited, followed by CMP, after which the polyimide material is deposited. After CMP is performed on the polyimide material, a second oxide material is deposited, after which CMP is performed, resulting in the intermediate stage of fabrication shown in FIG. 2D. As discussed above, various deposition methods may be used to produce the layers of the hard mask 178, as will be appreciated by the skilled artisan.

Figures 2E, 2F:
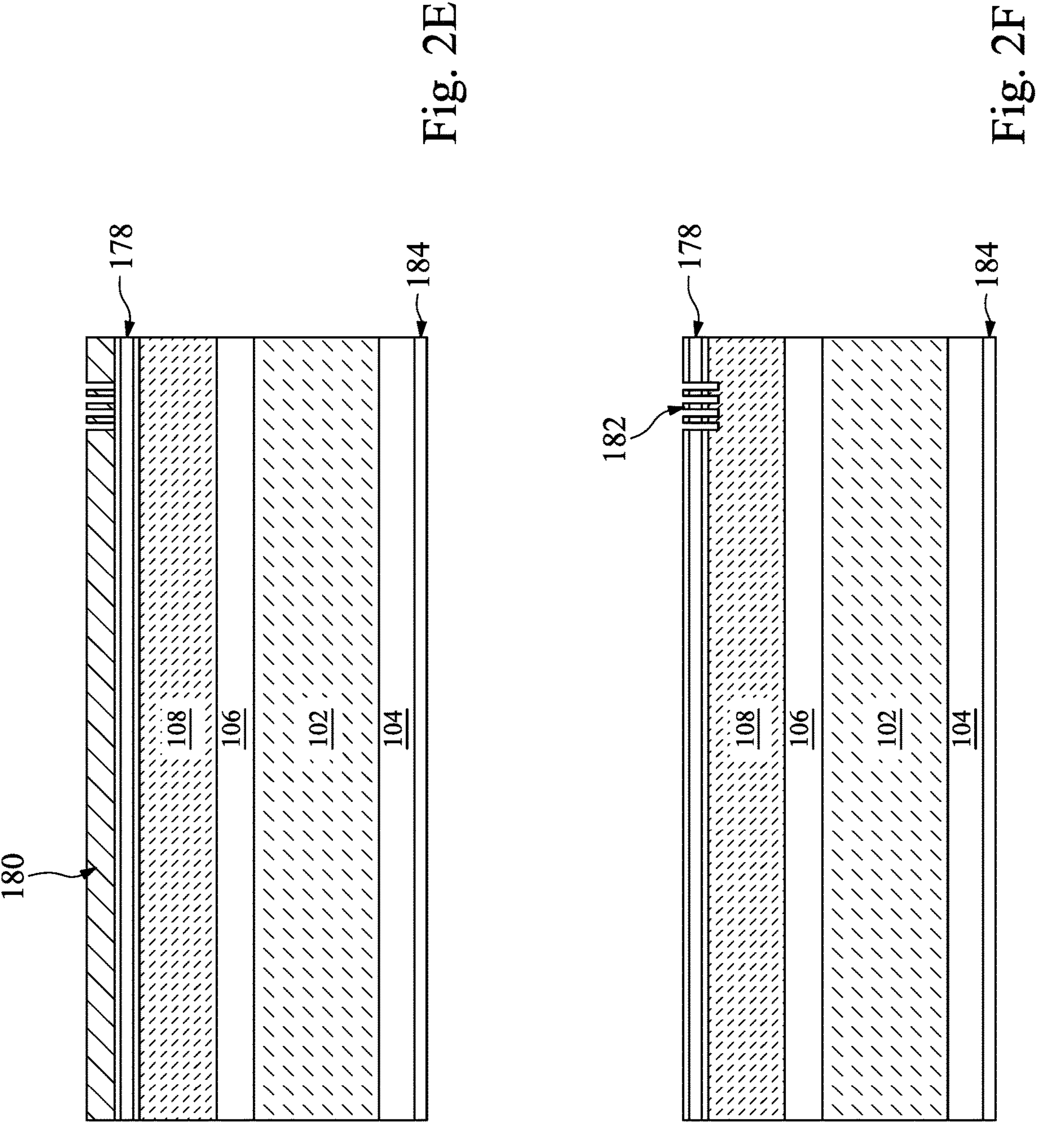
Figures 2G, 2H:
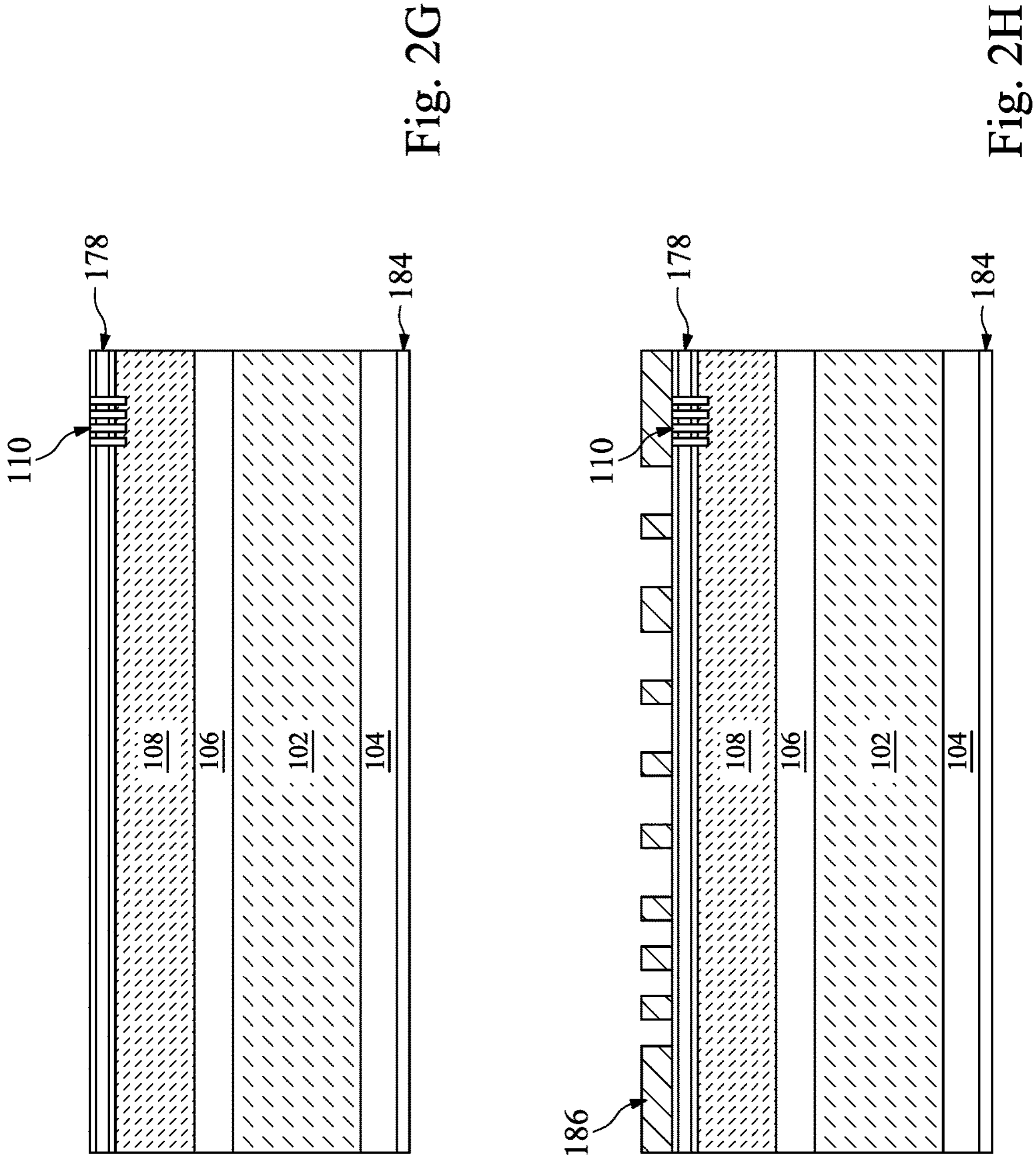
Figures 2I, 2J:
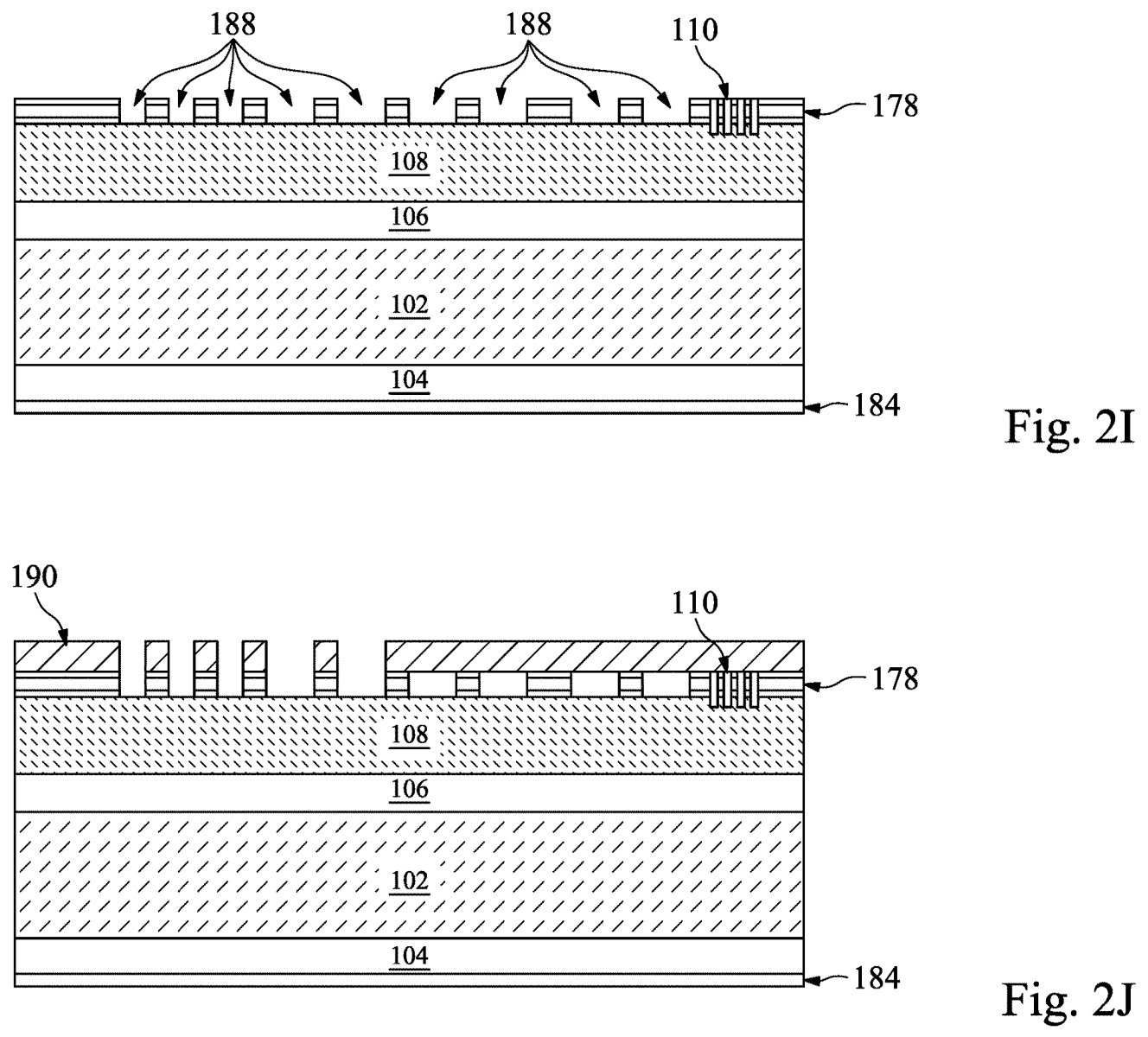
Figures 2K, 2L:
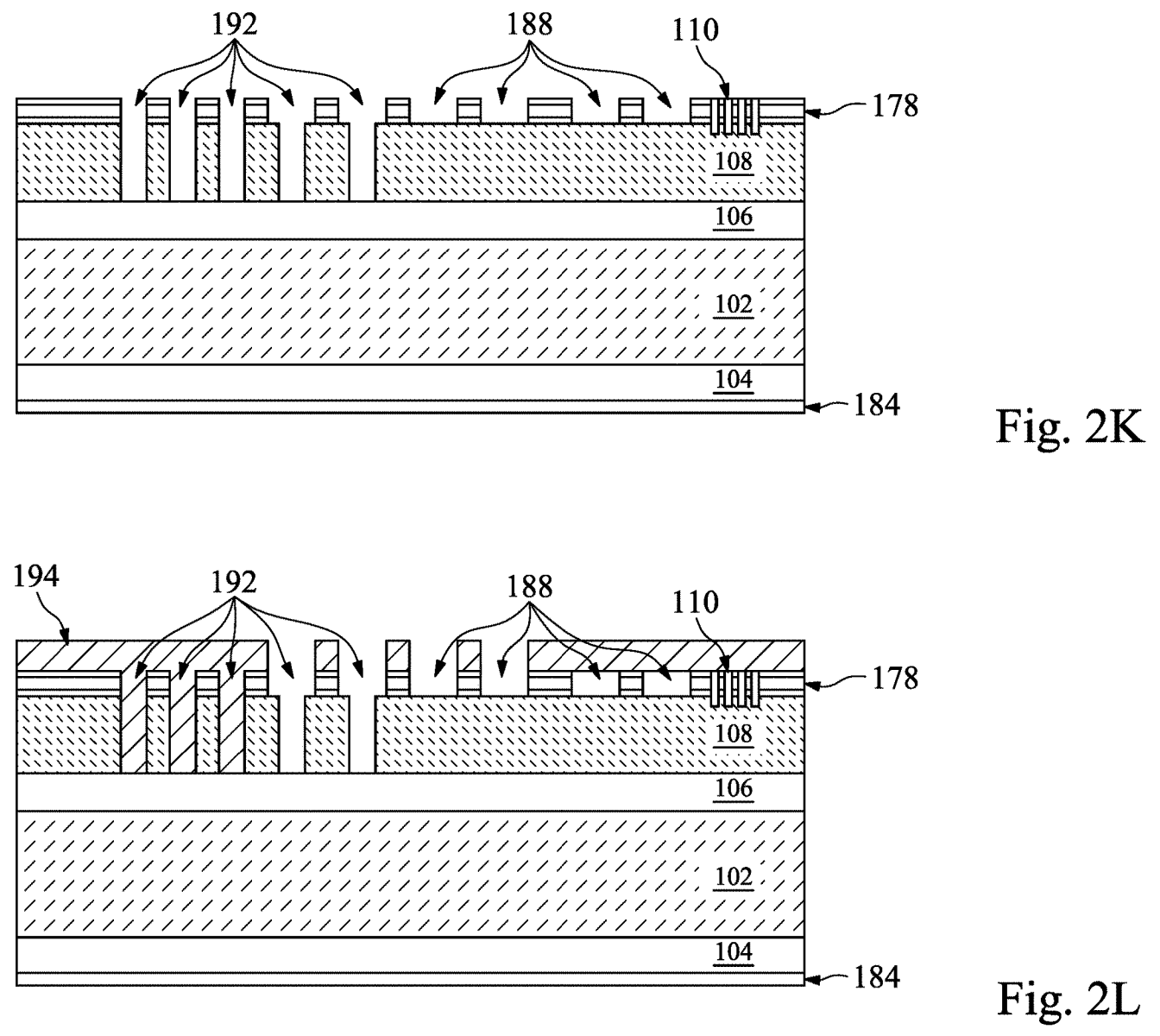
Figures 2M, 2N:
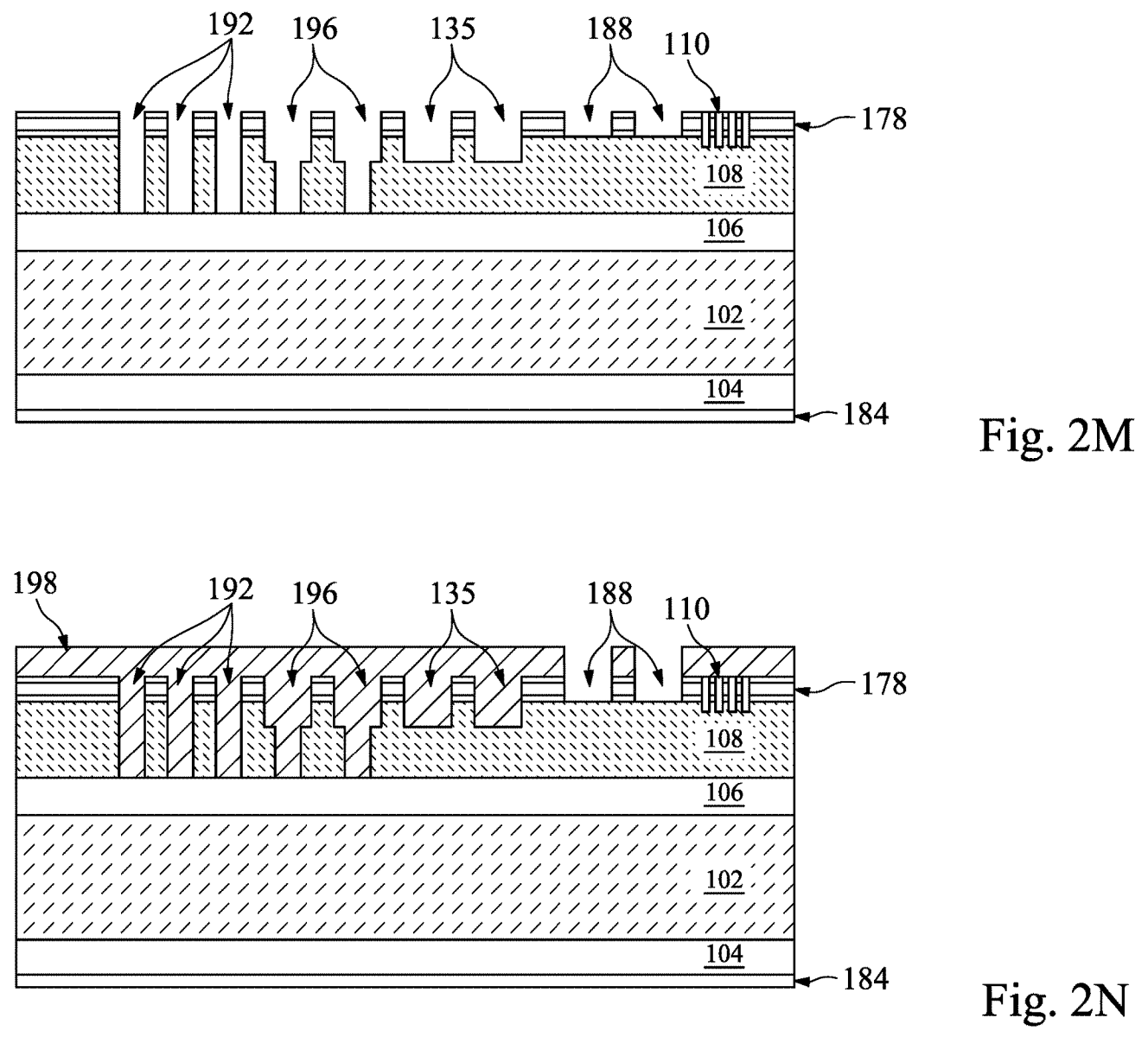
Figures 2O, 2P:
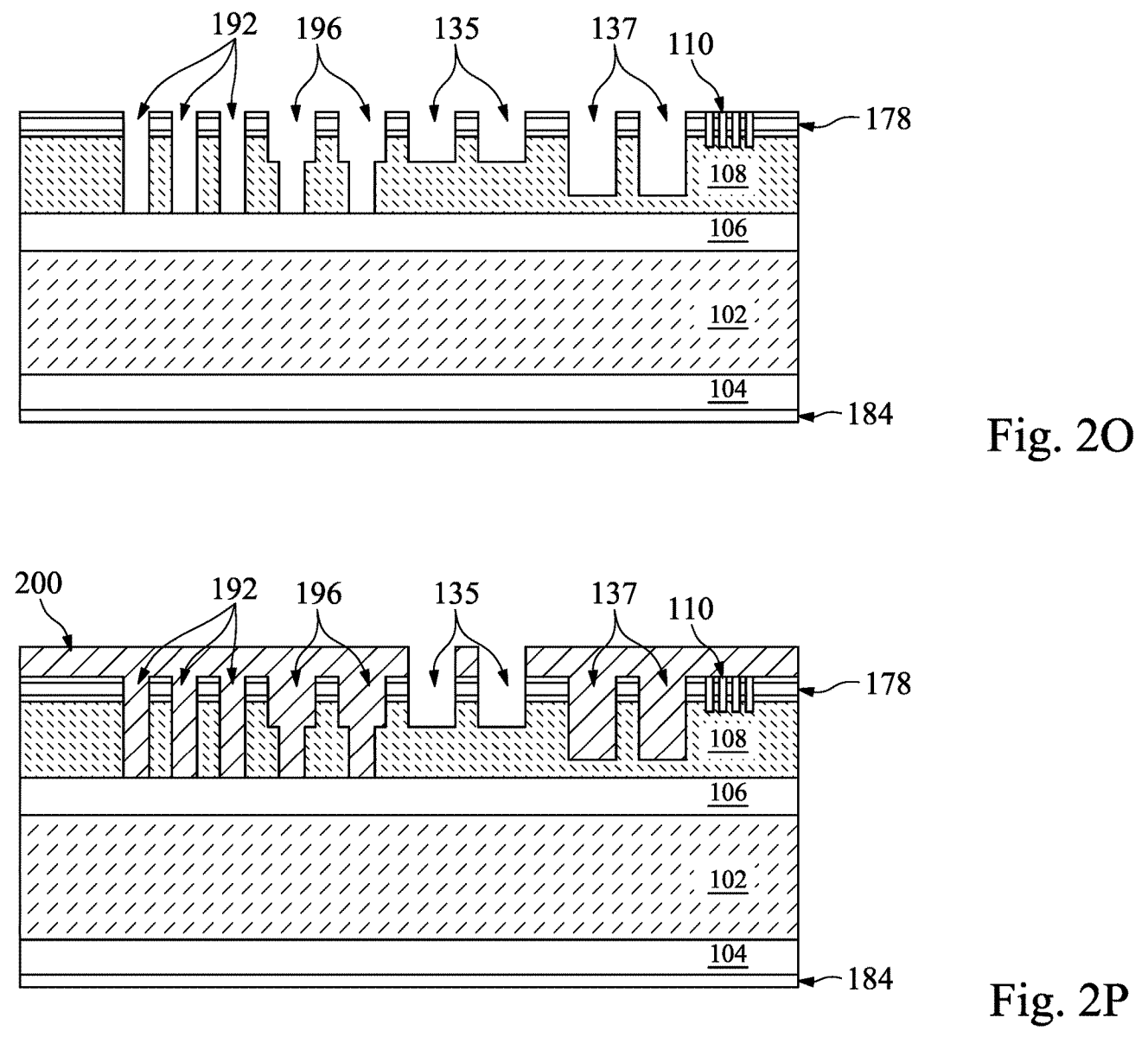

A photoresist 180 is then deposited and patterned on the hard mask 178, as illustrated in FIG. 2E. In some embodiments, the photoresist 180 is applied to the hard mask 178, after which portions of the photoresist 180 are developed by exposure from a suitable light source to form a pattern thereon. The unexposed portions are then removed, resulting in the patterned photoresist 180 shown in FIG. 2E. Etching is then performed to remove those portions of the hard mask 180 and/or underlying first silicon layer 108 to form distributed Bragg reflector (DBR) holes 182. Suitable removal processes include, for example and without limitation, an etching process implemented as a dry etching process, a RIE process, a wet etching process, some other etching process, or a combination of the foregoing. In accordance with some embodiments, the DBR holes 182 may be implemented with a depth in the range of 0.01 um to 0.6 um, and in some embodiments, the depth of the DBR holes 182 may be less than or equal to 0.4 um. FIG. 2F provides an illustration of the photonic device 100 after formation of the DBR holes 182. The DBR holes 182 are then filled with a suitable material having a desired refractive index for forming the DBR 110, as shown in FIG. 2G. In accordance with some embodiments, the DBR holes 182 are filled with a silicate glass, an oxide material, including, for example and without limitation, undoped silicate glass, BPSG glass, or the like.

In FIG. 2H, a photoresist 186 is then deposited and patterned on the hard mask 178. In some embodiments, the photoresist 186 is applied to the hard mask 178, after which portions of the photoresist 186 are developed by exposure from a suitable light source to form a pattern thereon. The unexposed portions are then removed, resulting in the patterned photoresist 186 shown in FIG. 2H. Etching is then performed to remove those portions of the hard mask 186 and/or underlying first silicon layer 108 to form strip and rib hard mask holes 188, as illustrated in FIG. 2I. Suitable removal processes include, for example and without limitation, an etching process implemented as a dry etching process, a RIE process, a wet etching process, some other etching process, or a combination of the foregoing.

A photoresist 190 is then deposited and patterned on the hard mask 178, as shown in FIG. 2J. In some embodiments, the photoresist 190 is applied to the hard mask 178, after which portions of the photoresist 190 are developed by exposure from a suitable light source to form a pattern thereon. The unexposed portions are then removed, resulting in the patterned photoresist 190 shown in FIG. 2J. Etching is then performed to remove those portions of the first silicon layer 108 to enable formation of strip holes 192, as illustrated in FIG. 2K. Suitable removal processes include, for example and without limitation, an etching process implemented as a dry etching process, a RIE process, a wet etching process, some other etching process, or a combination of the foregoing.

In FIG. 2L, a photoresist 194 is deposited and patterned on the hard mask 178 and in a portion of the strip holes 192. As illustrated in FIG. 2L, the photoresist is further patterned to enable formation of the first rib waveguide component 124. The photoresist 194 is then exposed, and the unexposed portions of the photoresist 194 are removed, resulting in the intermediate fabrication stage of the photonic device 100 shown in FIG. 2L. Thereafter, etching is then performed to remove those portions of the first silicon layer 108 to enable formation of R2S holes 192 and the first contact holes 135, as illustrated in FIG. 2M. Suitable etching processes include, for example and without limitation, a dry etching process, a RIE process, a wet etching process, some other etching process, or a combination of the foregoing.

In FIG. 2N, a photoresist 198 is deposited and patterned on the hard mask 178 and in the strip holes 192, the R2S holes 196, and the first contact holes 135. As illustrated in FIG. 2N, the photoresist 198 is applied, after which portions of the photoresist 198 are developed by exposure from a suitable light source to enable formation of the second rib waveguide component 126. Thereafter, etching is then performed to remove those portions of the first silicon layer 108 to enable formation of second contact holes 137, as illustrated in FIG. 2O. Suitable etching processes include, for example and without limitation, a dry etching process, a RIE process, a wet etching process, some other etching process, or a combination of the foregoing.

Figures 2Q, 2R:
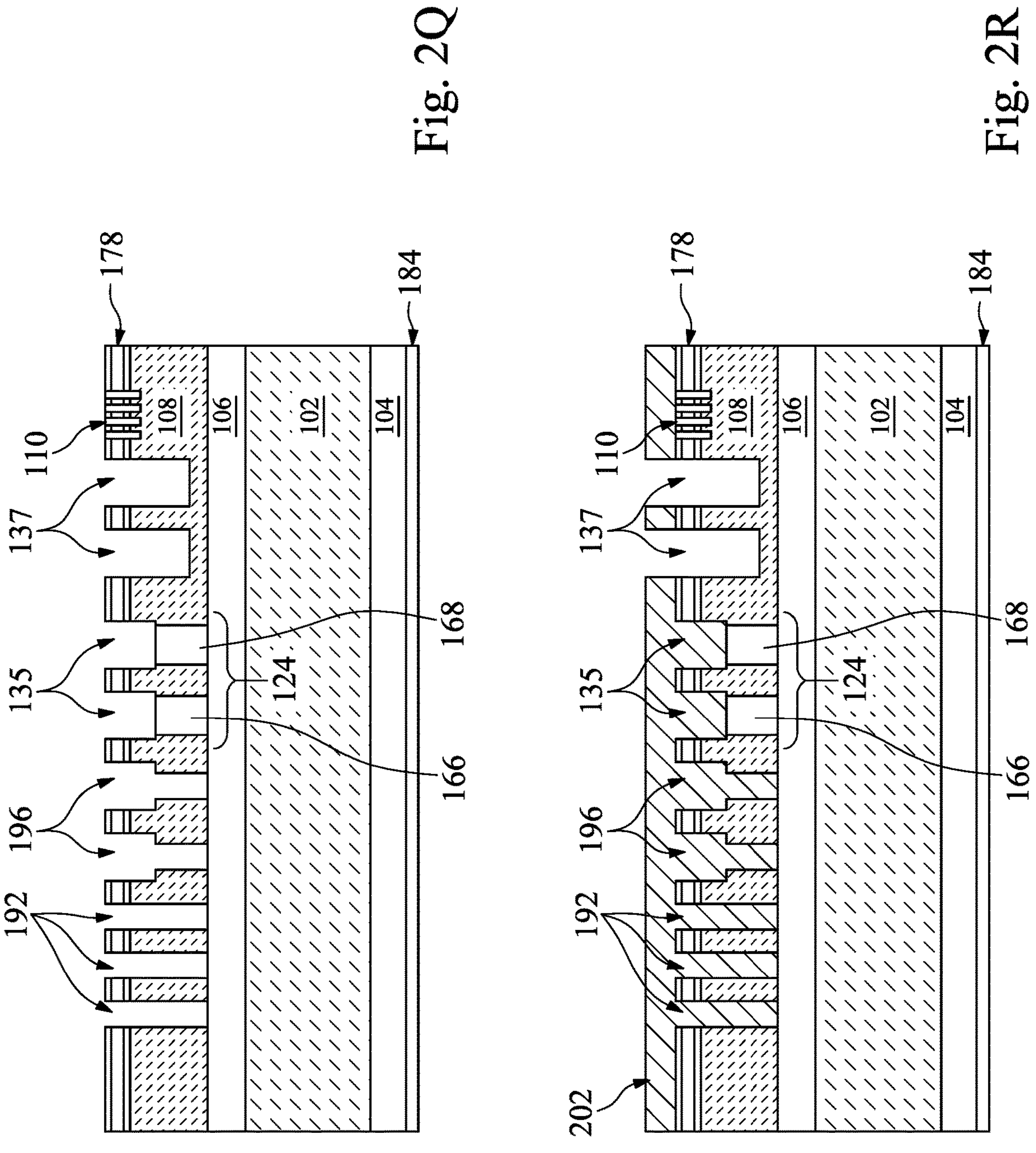

A photoresist 200 is then formed and patterned on the photonic device 100, as shown in FIG. 2P. Accordingly, photoresist 200 is deposited into the strip holes 192, the R2S holes 196, and the second contact holes 137. Doping is then performed on the silicon layer 108 exposed in the first contact holes 135. As shown in FIG. 2Q, a first rib N+ doped component 166, and a first rib P+ doped component 168 are formed within the first silicon layer 108 in the first contact holes 135. As will be appreciated, the doping to form components 166 and 168 may be done, for example, by ion implantation. As discussed above, an ion implanter is used to implant atoms into a silicon crystal lattice, modifying the conductivity of the lattice in the implanted location. An ion implanter generally includes an ion source, a beam line, and a process chamber. The ion source produces the desired ions (here, for example, Co, Ti, Ni, Pt, or Pb, depending on desired N- or P-type electrode). The beam line organizes the ions into a beam having high purity in terms of ion mass, energy, and species. The ion beam is then used to irradiate the wafer substrate in a process chamber. The ion beam strikes the exposed regions on the wafer substrate, and the ions can be implanted into the substrate as dopants at desired depths. Alternatively, the substrate can be partially etched, followed by blanket deposition of a metal, followed by annealing in which the metal reacts with the underlying exposed silicon. Unreacted metal can then be removed, for example with a selective etch process.

Figures 2S, 2T:
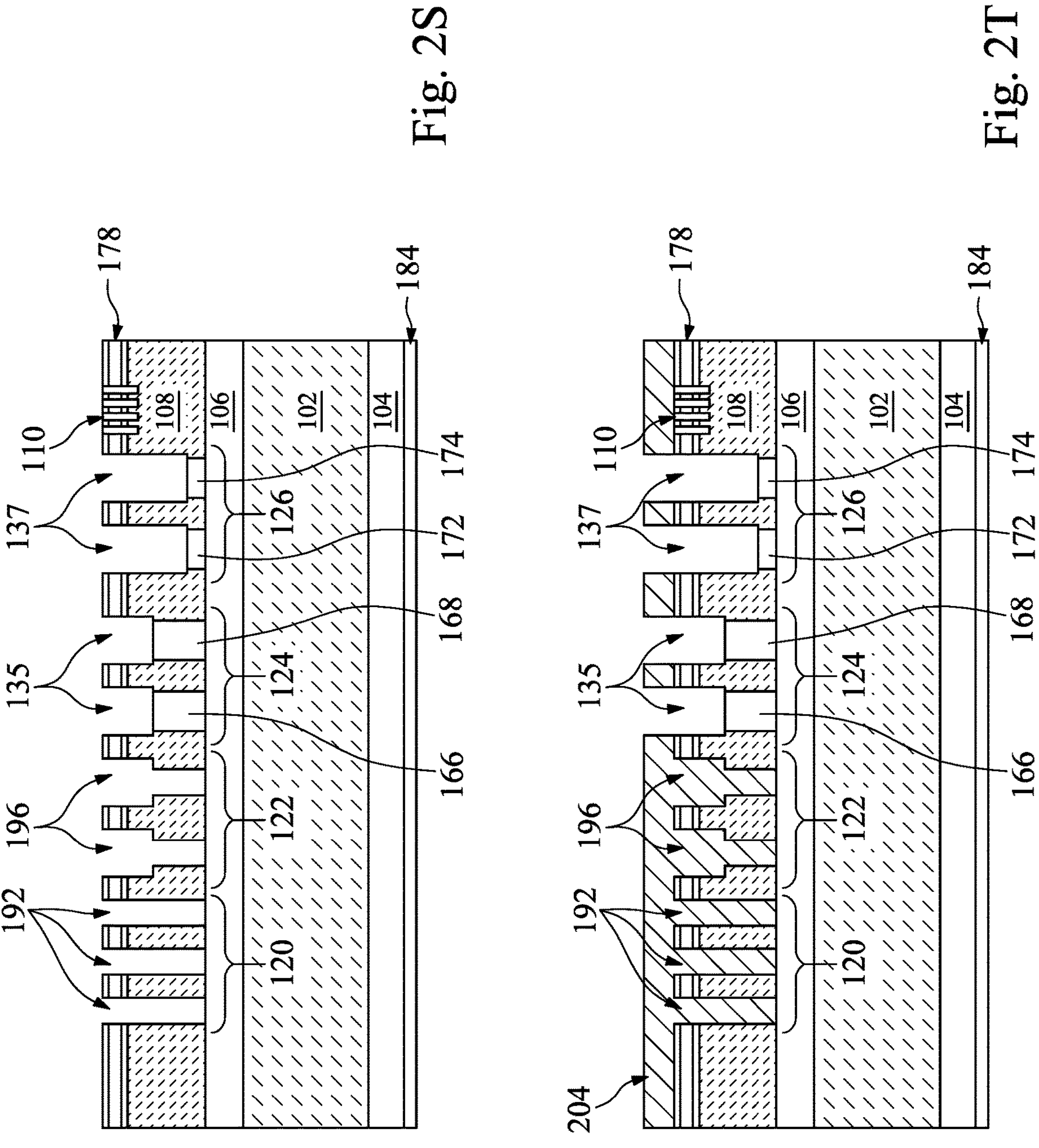

A photoresist 202 is then deposited into the strip holes 192, the R2S holes 196, and the first contact holes 135 as shown in FIG. 2R. Doping is then performed on the silicon layer 108 exposed in the second contact holes 137. As shown in FIG. 2S, a second rib N+ doped component 172, and a second P+ doped component 174 are formed within the first silicon layer 108 in the second contact holes 137. As will be appreciated, the doping to form components 172 and 174 may be done, for example, by ion implantation. Alternatively, the substrate can be partially etched, followed by blanket deposition of a metal, followed by annealing in which the metal reacts with the underlying exposed silicon. Unreacted metal can then be removed, for example with a selective etch process.

Figures 2U, 2V:
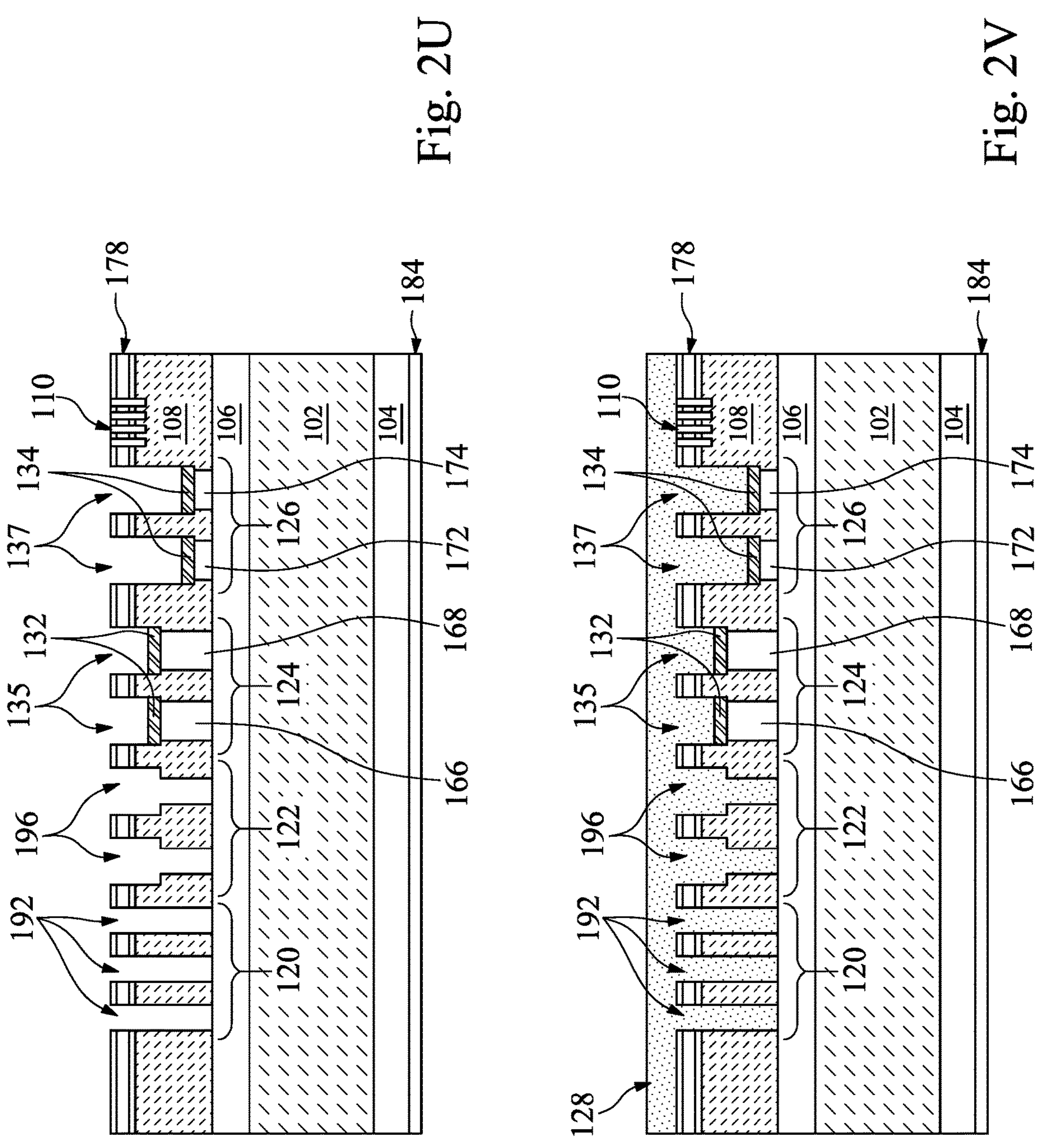
Figures 2W, 2X:
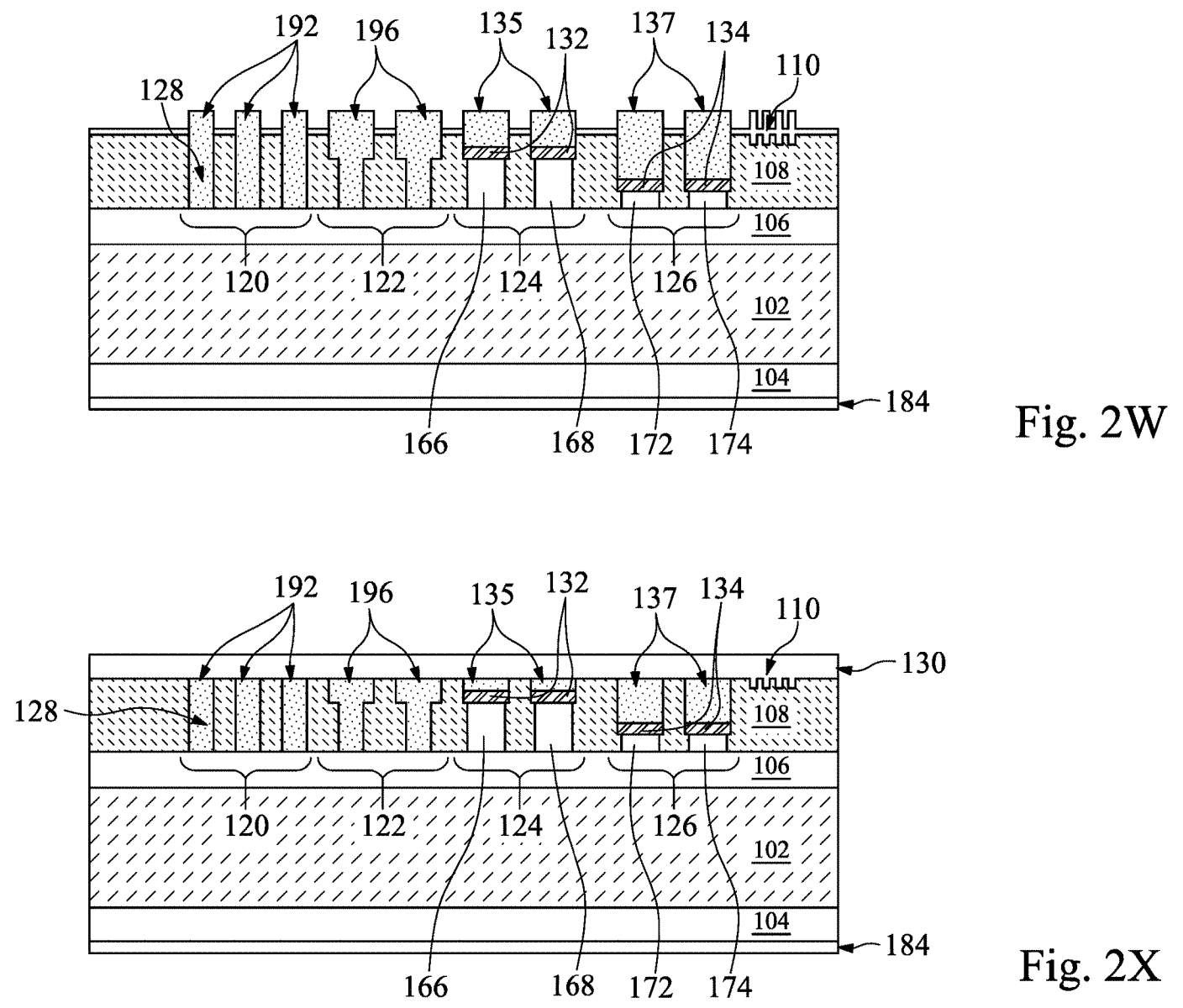
Figures 2Y, 2Z:
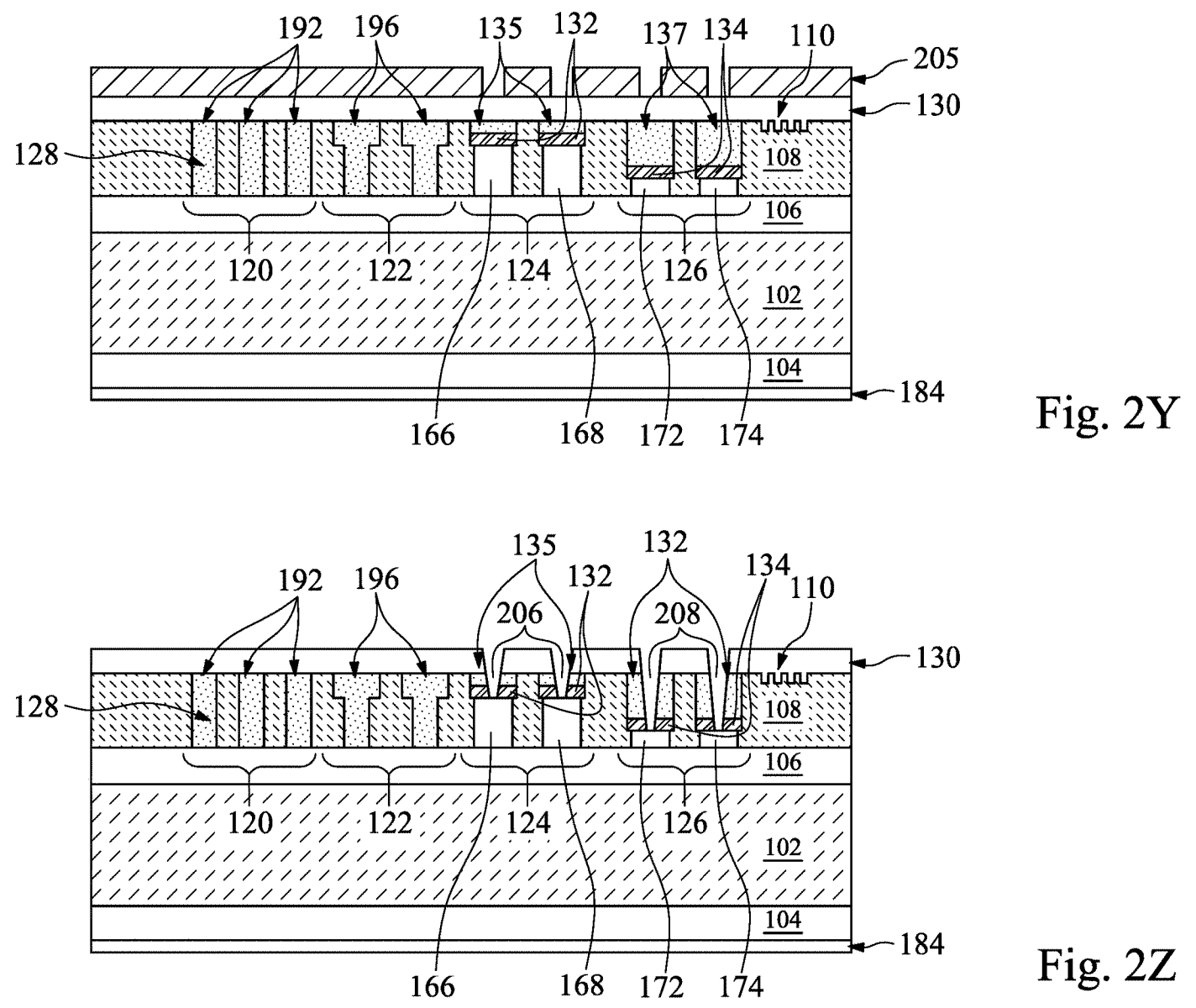

As shown in FIG. 2T, a photoresist 204 is applied and patterned, protecting the strip holes 192, the R2S holes 196, and exposing the first contact holes 135 and the second contact holes 137. Thereafter, a first contact etch stop layer (CESL1) 132 and a second etch stop layer (CESL2) 134 are deposited in the first contact holes 135 and the second contact holes 137 on the respective doped components 166-168 and 172-174. In accordance with some embodiments, the first contact etch stop layer (CESL1) 132 and the second contact etch stop layer (CESL2) 134 may suitably comprise a layer of material that has drastically different etching characteristics than the material to be etched, so as to stop or halt the etching processing of the layer deposited on the etch stop layer. Accordingly, the first contact etch stop layer (CESL1) 132 and the second contact etch stop layer (CESL2) 134 may comprise, for example and without limitation tantalum oxide (TaO), tantalum (Ta), titanium (Ti), silicon nitride (SiN), and the like. In some embodiments, the deposition of the first contact etch stop layer (CESL1) 132 and the second contact etch stop layer (CESL2) 134 may occur simultaneously with the same material as shown in FIG. 2U, or may occur sequentially, with intervening photoresist applications, as will be appreciated, along with different types of etch stop material. Accordingly, the illustration in FIG. 2U showing the formation of the first contact etch stop layer (CESL1) 132 and the second contact etch stop layer (CESL2) 134 in respective contact holes 135 and 137 is intended to illustrate one example process of deposition thereof.

A silicate glass material 128 is then deposited on the photonic device 100, as shown in FIG. 2V. As indicated above, the silicate glass material 128 is suitably formed in the strip holes 192, the R2S holes 196, the first contact holes 135, and the second contact holes 137. Thereafter, CMP and polyimide etching (i.e., removal of the hard mask 178) is performed, as depicted in FIG. 2W. Undoped silicate glass 130 is then deposited, as shown in FIG. 2X. In accordance with some embodiments, the undoped silicate glass (USG) component 130 may be implemented having a thickness in the range of 5,000 angstroms to 10,000 angstroms. In one embodiment, the undoped silicate glass (USG) component 130 is implanted with a thickness of 8 angstroms.

In FIG. 2Y, a photoresist 204 is deposited and patterned on the undoped silicate glass (USG) component 130. As shown, the photoresist 204 is suitably patterned to allow for subsequent formation of first contact cavities 206 and second contact cavities 208 respectively located within the first contact holes 135 and the second contact holes 137. Etching is then performed to create the first contact cavities 206 and the second contact cavities 208, as shown in FIG. 2Z. In accordance with some embodiments, CMP may also be performed to planarize the undoped silicate glass (USG) component 130. Thereafter, as will be appreciated, subsequent formation of the photonic device 100 may be performed, e.g., forming the contacts 136, 138, the metal components 140, the bump pad 142, formation of the pillar 114, the pillar cavity 116, etc.

Figure 3:
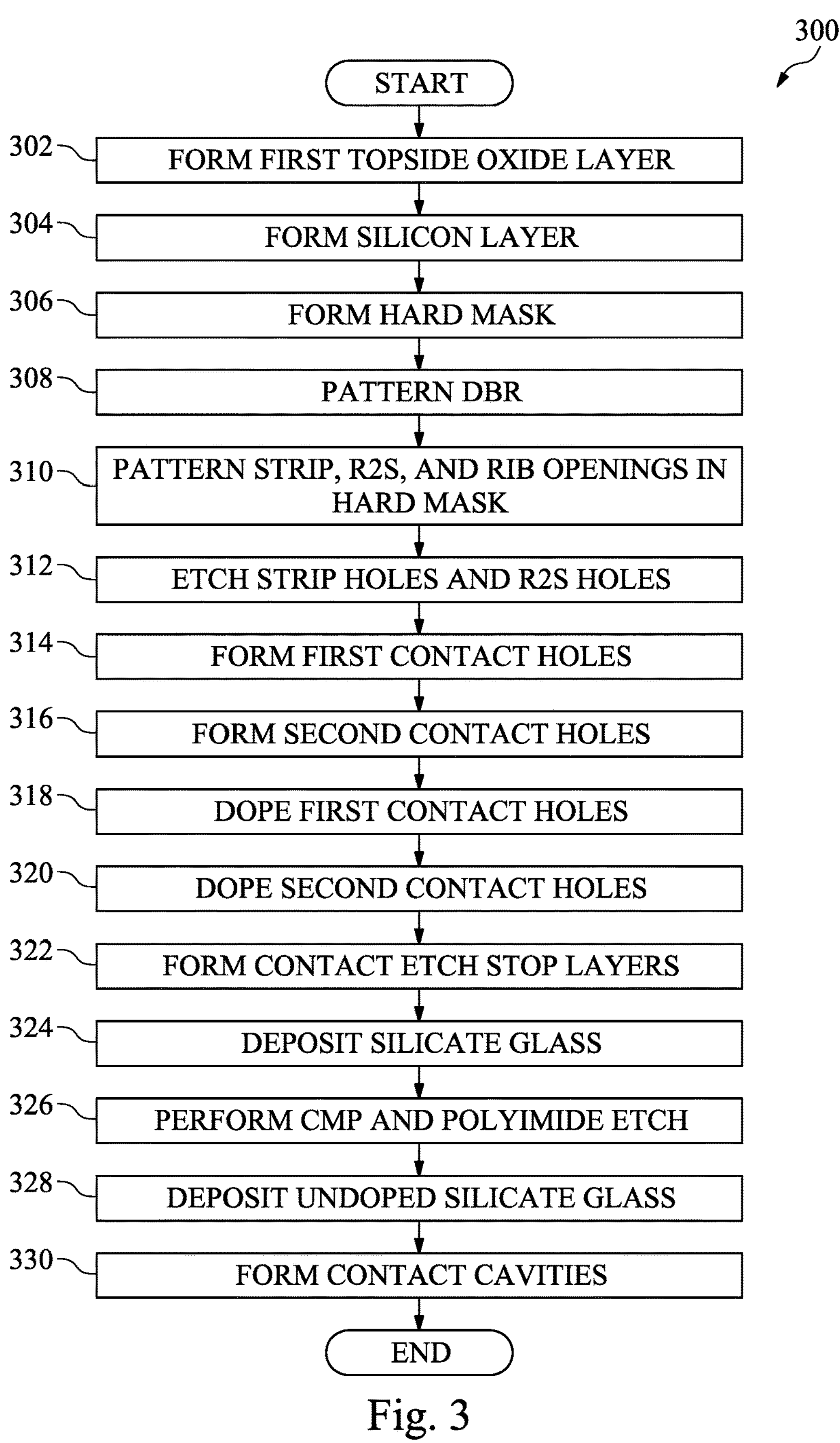
FIG. 3 is a flowchart of a method of fabricating a photonic device structure in accordance with some embodiments.

Referring now to FIG. 3, there is shown a flowchart 300 illustrating a method of fabricating a photonic device structure in accordance with one exemplary embodiment. As shown in FIG. 3, the on the method begins at step 302, whereupon a first topside oxide layer 106 is formed on a substrate 102, as shown in FIG. 2B. In some embodiments, the substrate 102 may be an SOI (Silicon on Insulator) substrate. A silicon layer 108 is then formed on the first topside oxide layer 106 at step 304. FIG. 2C provides an illustrative example of the deposition of the silicon layer 108. At step 306, a hard mask 178 is formed on the silicon layer 108, as illustrated in FIG. 2D.

A distributed Bragg reflector 110 is then patterned in the hard mask 178 and the silicon layer 108 at step 308. FIGS. 2E and 2F, as discussed above, provide illustrative examples of the processes performed at step 308. At step 310, strip, R2S, and rib hard mask openings 188 are patterned, as shown in FIGS. 2G-2I. Thereafter, at step 312 etching is performed to remove portions of the silicon layer 108 to form the strip holes 192 and R2S holes 196. FIGS. 2J-2K provide illustrations of the formation of the strip holes 192 and R2S holes 196 in accordance with some embodiments.

At step 314, first contact holes 135 corresponding to a first rib waveguide component 124 are formed in silicon layer 108. As illustrated in FIGS. 2L-2M, a photoresist 192 may be deposited and patterned on the silicon layer 108, followed by etching to remove portions of the silicon layer 108, thereby defining the first contact holes 135. At step 316, second contact holes 137 corresponding to the second rib waveguide component 126 are formed in the silicon layer 108. FIGS. 2N-2O illustrate that formation of the second contact holes 137 may include the application and patterning of a photoresist 198, etching to remove a portion of the silicon layer 108, resulting in the second contact holes 137.

At step 318, the silicon layer 108 of the first contact holes 135 is doped, as shown in FIGS. 2P-2Q. As discussed above, N+ component 166 and P+ component 168 are formed in the first contact holes 135 of the first rib waveguide component 124. At step 320, the silicon layer 108 of the second contact holes 137 is doped, as shown in FIGS. 2R-2S. As discussed above, N+ component 172 and P+ component 174 are formed in the second contact holes 137 of the second rib waveguide component 126.

Thereafter, at step 322, a first contact etch stop layer (CESL1) 132 and a second contact etch stop layer (CESL2) 134 are formed in respective first and second contact holes 135 and 137. As illustrated in FIG. 2U, the formation of the first contact etch stop layer (CESL1) 132 and the second contact etch stop layer (CESL2) 134 may occur simultaneously at step 322, or may occur sequentially (regardless of order). At step 324, a silicate glass 128 is deposited, filling in the holes 135, 137, 192, 196, as illustrated in FIG. 2V. Thereafter, at step 326 CMP and polyimide etching (i.e., removal of the hard mask 178) is performed, as depicted in FIG. 2W. At step 328, a layer of undoped silicate glass 130 is deposited on the silicon layer 108, as illustrated in FIG. 2X. At step 330, contact cavities 206-208 are formed in respective first and second contact holes 135 and 137, as shown in FIG. 2Z.

In accordance with a first embodiment, there is provided a photonic device structure. The structure includes a substrate that has an oxide layer and a silicon layer that is formed on the oxide layer. The structure further includes a plurality of waveguide components that are formed in the silicon layer. A first waveguide component of the plurality includes at least one first contact hole having a first contact hole depth, and a second waveguide component of the plurality includes at least one second contact hole having a second contact hole depth, such that the depths of the first contact hole and the second contact hole are different.

In accordance with a second embodiment, there is provided a photonic semiconductor device. The photonic semiconductor device includes a substrate and an oxide layer that is formed on the substrate. The device further includes a silicon layer that is formed on the oxide layer. The silicon layer of the photonic semiconductor device includes a strip waveguide component, a rib to strip waveguide component, and a plurality of rib waveguide components. In addition, the photonic semiconductor device includes a facet positioned adjacent to the silicon layer.

In accordance with a third embodiment, there is provided a method for fabricating a photonic semiconductor device. The method includes forming a silicon layer on a first topside oxide layer of a substrate. The method also includes forming a strip waveguide, a rib to strip waveguide and/or a distributed Bragg reflector waveguide in the silicon layer. First contact holes of a first rib waveguide are then formed in the silicon layer with each of the first contact holes having a first contact hole depth. Second contact holes of a second rib waveguide are then formed in the silicon layer with each of the second contact holes having a second contact hole depth that is different from the first contact hole depth. A first one of the first contact holes is then doped a first dopant concentration of N+ and a second one of the first contact holes is doped to the first dopant concentration of P+. Thereafter, a first one of the second contact holes is then doped a second dopant concentration of N+ and a second one of the second contact holes is doped to the second dopant concentration of P+, such that the first dopant concentration is different from the second dopant concentration. A first contact etch stop layer is then formed in each of the first contact holes, and a second contact etch stop layer formed in each of the second contact holes.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A photonic device structure, comprising:
- a substrate including an oxide layer formed thereon;
- a silicon layer formed on the oxide layer; and
- a plurality of waveguide components formed in the silicon layer,
- wherein:
  - a first waveguide component of the plurality of waveguide components has at least one first contact hole in the silicon layer having a first contact hole depth, and
  - a second waveguide component of the plurality of waveguide components has at least one second contact hole in the silicon layer having a second contact hole depth, wherein the first contact hole depth and the second contact hole depth are different.

2. The photonic device structure of claim 1, further comprising:
- a first contact etch stop layer formed in the at least one first contact hole; and
- a second contact etch stop layer formed in the at least one second contact hole.

3. The photonic device structure of claim 2, wherein the at least one first contact hole includes a first dopant concentration of N+ and wherein at least a second first contact hole includes the first dopant concentration of P+, and wherein at least one second contact hole includes a second dopant concentration of N+ and wherein at least a second contact hole includes the second dopant concentration of P+, and wherein the first dopant concentration is different from the second dopant concentration.

4. The photonic device structure of claim 3, wherein the second dopant concentration is less than the first dopant concentration.

5. The photonic device structure of claim 4, wherein the first contact etch stop layer and the second contact etch stop layer are selected from the group consisting of an oxide, SiN, undoped silicate glass, fluorosilicate glass, or borophosphosilicate glass.

6. The photonic device structure of claim 4, wherein a depth of the first contact etch stop layer is 5% or greater than the first contact hole depth.

7. The photonic device structure of claim 4, wherein a depth of the second contact etch stop layer is 5% or greater than the second contact hole depth.

8. A photonic semiconductor device comprising:

a substrate;

a oxide layer formed on the substrate;

a silicon layer formed on the oxide layer, the silicon layer comprising:

a strip waveguide component, a rib to strip waveguide component, and a plurality of rib waveguide components, wherein:

a first rib waveguide component of the plurality of rib waveguide components has a plurality of first contact holes in the silicon layer having a first contact hole depth, and a second rib waveguide component of the plurality of rib waveguide components has a plurality of second contact hole in the silicon layer having a second contact hole depth, wherein the first contact hole depth and the second contact hole depth are different; and a facet positioned adjacent to the silicon layer.

9. The photonic semiconductor device of claim 8, further comprising:

a distributed Bragg reflector formed in the silicon layer;

a pillar;

a pillar cavity formed in the substrate between the pillar and the first topside oxide layer; and a light source positioned on the pillar and optically coupled to the facet.

10. The photonic semiconductor device of claim 8, wherein the first contact holes have a depth in the range of 9,000 to 12,000 angstroms.

11. The photonic semiconductor device of claim 8, wherein the second contact holes have a depth in the range of 12,000 to 24,000 angstroms.

12. The photonic semiconductor device of claim 8, wherein at least one of the plurality of first contact holes includes a first dopant concentration of N+ and wherein at least a second one of the plurality of first contact holes includes the first dopant concentration of P+; and at least one of the plurality of second contact holes includes a second dopant concentration of N+ and wherein at least a second one of the plurality of second contact holes includes the second dopant concentration of P+, and wherein the first dopant concentration is different from the second dopant concentration.

13. The photonic semiconductor device of claim 12, wherein the second dopant concentration is less than the first dopant concentration.

14. The photonic semiconductor device of claim 12, wherein the first contact etch stop layer and the second contact etch stop layer are selected from the group consisting of an oxide, SiN, undoped silicate glass, fluorosilicate glass, or borophosphosilicate glass.

15. The photonic semiconductor device of claim 12, wherein a depth of the first contact etch stop layer is 5% or greater than the first contact hole depth, and wherein a depth of the second contact etch stop layer is 5% or greater than the second contact hole depth.

16. The photonic semiconductor device of claim 8, further comprising:

a first contact etch stop layer formed in each of the plurality of first contact holes; and a second contact etch stop layer formed in each of the plurality of second contact holes.

17. A method of fabricating a photonic semiconductor device, comprising:

forming a silicon layer on a first topside oxide layer of a substrate;

forming at least one of a strip waveguide, a rib to strip waveguide or a distributed Bragg reflector waveguide in the silicon layer;

forming a plurality of first contact holes of a first rib waveguide in the silicon layer each having a first contact hole depth;

forming a plurality of second contact holes of a second rib waveguide in the silicon layer each having a second contact hole depth, wherein the first contact hole depth and the second contact hole depth are different;

doping at least one of the plurality of first contact holes to a first dopant concentration of N+ and at least a second one of the plurality of first contact holes to the first dopant concentration of P+;

doping at least one of the plurality of second contact holes to a second dopant concentration of N+ and at least a second one of the plurality of second contact holes to the second dopant concentration of P+, wherein the first dopant concentration is different from the second dopant concentration;

forming a first contact etch stop layer in each of the plurality of first contact holes; and forming a second contact etch stop layer formed in each of the plurality of second contact holes.

* * * * *